(12) United States Patent
Yun (10) Patent No.: US 11,515,577 B2
(45) Date of Patent: Nov. 29, 2022

(54) BATTERY MODULE

(71) Applicant: LG Chem, Ltd., Seoul (KR)

(72) Inventor: Hyeon Ki Yun, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/049,138

(22) PCT Filed: Nov. 14, 2019

(86) PCT No.: PCT/KR2019/015500
§ 371 (c)(1),
(2) Date: Oct. 20, 2020

(87) PCT Pub. No.: WO2020/105952
PCT Pub. Date: May 28, 2020

(65) Prior Publication Data
US 2021/0234204 A1 Jul. 29, 2021

(30) Foreign Application Priority Data
Nov. 21, 2018 (KR) .......... 10-2018-0144637

(51) Int. Cl.
*H01M 10/42* (2006.01)
*H01M 50/502* (2021.01)
*H01M 50/105* (2021.01)
*H01M 50/543* (2021.01)
*H01M 50/204* (2021.01)

(52) U.S. Cl.
CPC ....... *H01M 10/425* (2013.01); *H01M 50/105* (2021.01); *H01M 50/204* (2021.01); *H01M 50/502* (2021.01); *H01M 50/543* (2021.01)

(58) Field of Classification Search
None
See application file for complete search history.

(56) References Cited

U.S. PATENT DOCUMENTS

2007/0238018 A1 10/2007 Lee et al.
2014/0087221 A1 3/2014 Kim et al.
(Continued)

FOREIGN PATENT DOCUMENTS

CN 103703606 A 4/2014
CN 105977575 A 9/2016
(Continued)

OTHER PUBLICATIONS

JP, 2017-076527 (a raw machine translation) (Apr. 20, 2017) (Detailed Description) (Year: 2017).*
(Continued)

*Primary Examiner* — Carmen V Lyles-Irving
(74) *Attorney, Agent, or Firm* — Lerner, David, Littenberg, Krumholz & Mentlik, LLP (57) ABSTRACT

A battery module may include a plurality of battery cells that are stacked on each other; and a circuit module which is electrically connected to the plurality of battery cells and includes a plate-shaped circuit part having a width and a length. The circuit part may be disposed between any one pair of battery cells of the plurality of battery cells in a state in which a width direction of the circuit part is parallel to a direction perpendicular to a direction in which the plurality of battery cells are stacked.

7 Claims, 8 Drawing Sheets

(56) References Cited

U.S. PATENT DOCUMENTS

| | | | |
|---|---|---|---|
| 2014/0134462 A1* | 5/2014 | Choi | B60L 58/27 |
| | | | 429/7 |
| 2014/0370353 A1 | 12/2014 | Oshiba et al. | |
| 2015/0104683 A1 | 4/2015 | Lundstrom | |
| 2019/0001838 A1 | 1/2019 | Choi et al. | |
| 2019/0348720 A1 | 11/2019 | Oh et al. | |

FOREIGN PATENT DOCUMENTS

| | | |
|---|---|---|
| CN | 206076432 U | 4/2017 |
| EP | 3206242 A1 | 8/2017 |
| JP | 2004055492 A | 2/2004 |
| JP | 2005209367 A | 8/2005 |
| JP | 2007299544 A | 11/2007 |
| JP | 2009123371 A | 6/2009 |
| JP | 2013004315 A | 1/2013 |
| JP | 2014527688 A | 10/2014 |
| JP | 2015018790 A | 1/2015 |
| JP | 2015518240 A | 6/2015 |
| JP | 2017076527 A | 4/2017 |
| KR | 20070100555 A | 10/2007 |
| KR | 20130002749 A | 1/2013 |
| KR | 20130018494 A | 2/2013 |
| KR | 20160034676 A | 3/2016 |
| KR | 20180038253 A | 4/2018 |
| KR | 20180099437 A | 9/2018 |

OTHER PUBLICATIONS

Search Report for European Application No. 19886927.3 dated Sep. 9, 2021. 2 pgs.

International Search Report for Application No. PCT/KR2019/015500 dated Feb. 21, 2020, 3 pages.

Search Report dated Mar. 24, 2022 from Office Action for Chinese Application No. 201980016114.6 dated Apr. 1, 2022. 4 pgs.

* cited by examiner

【FIG. 1】

PRIOR ART

[FIG. 2]

PRIOR ART

[FIG. 3]

PRIOR ART

BATTERY MODULE

TECHNICAL FIELD

This application is a national phase entry under 35 U.S.C. § of International Application No. PCT/2019/015500, filed on Nov. 14, 2019, which claims the benefit of priority to Korean Patent Application No. 10-2018-0144637 filed on Nov. 21, 2018, the disclosures of which are each hereby incorporated by reference herein their entirety.

The present invention relates to a battery module.

BACKGROUND ART

In recent years, with an increase in the demand for portable electronic devices, such as laptop computers, smartphones, and tablet computers, research has been actively conducted on high-performance secondary batteries that are capable of being repeatedly charged and discharged.

In addition, secondary batteries have come to be widely used in middle- or large-sized devices, such as vehicles, robots, and satellites, as well as small-sized devices, such as portable electronic devices. In particular, as fossil fuels are being depleted and increasing attention is being paid to environmental pollution, research on hybrid vehicles and electric vehicles is being actively conducted. The most essential part of a hybrid vehicle or an electric vehicle is a battery pack configured to supply electric power to a motor.

The hybrid vehicle or the electric vehicle has an advantage in that fuel economy is high and no pollutants are discharged or the amount of pollutants that are discharged is reduced compared to a vehicle using only an internal combustion engine, since it is possible to obtain drive force from the battery pack. The battery pack used in the hybrid vehicle or the electric vehicle includes a battery module, which includes a plurality of battery cells. The plurality of battery cells are connected to each other in series and/or in parallel, whereby the capacity and output of the battery module are increased.

Since a plurality of battery cells are closely arranged in the inner space of the battery pack, it is particularly important to smoothly discharge the heat generated from the plurality of battery cells to the outside. If the heat generated by the electrochemical reaction in the battery cell is not smoothly discharged to the outside, heat may accumulate in the battery module, resulting in deterioration, ignition or explosion of the battery module.

Figure 1:
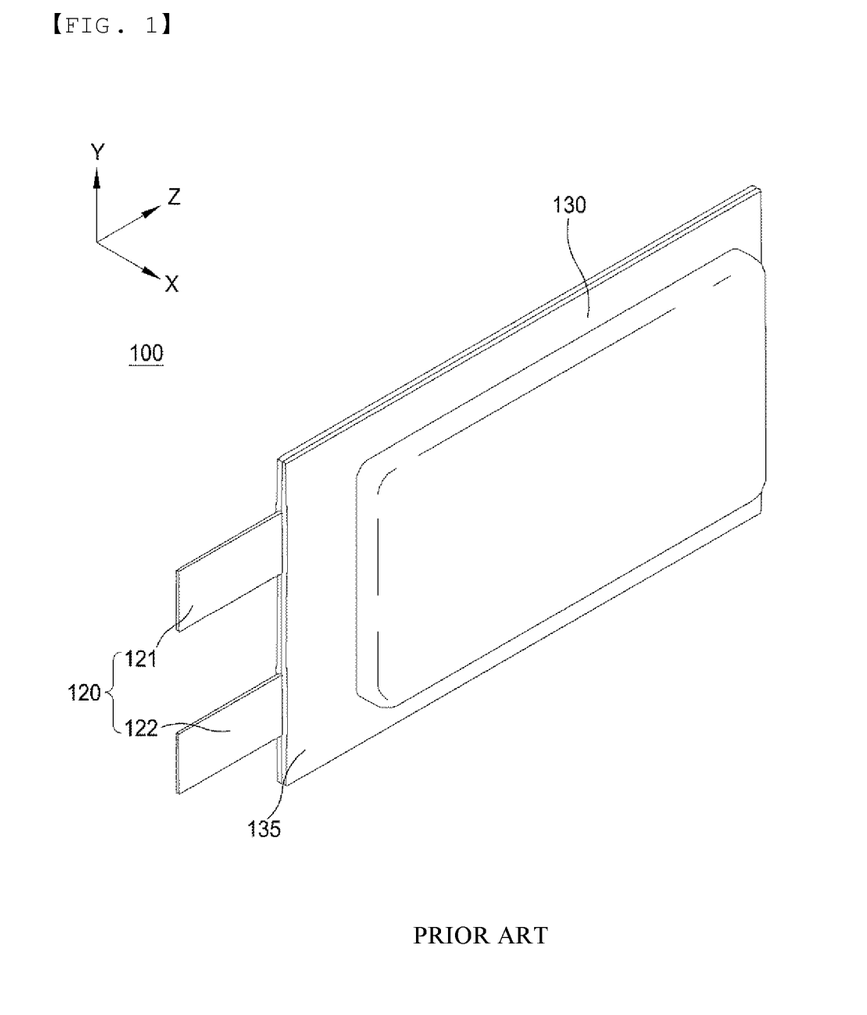
FIG. 1 is a perspective view schematically showing a battery cell of a conventional battery module.
Figure 2:
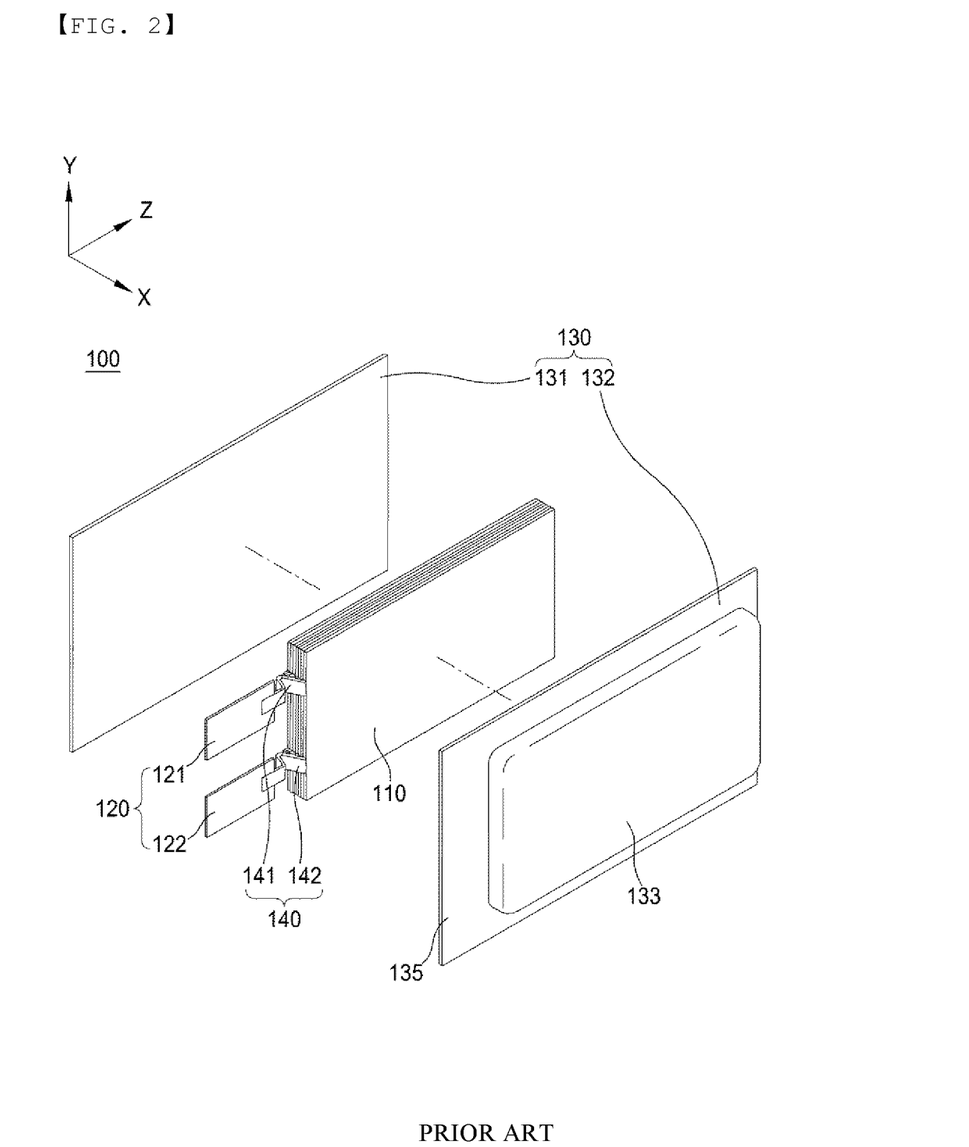
FIG. 2 is an exploded perspective view schematically showing the battery cell of the conventional battery module.
Figure 3:
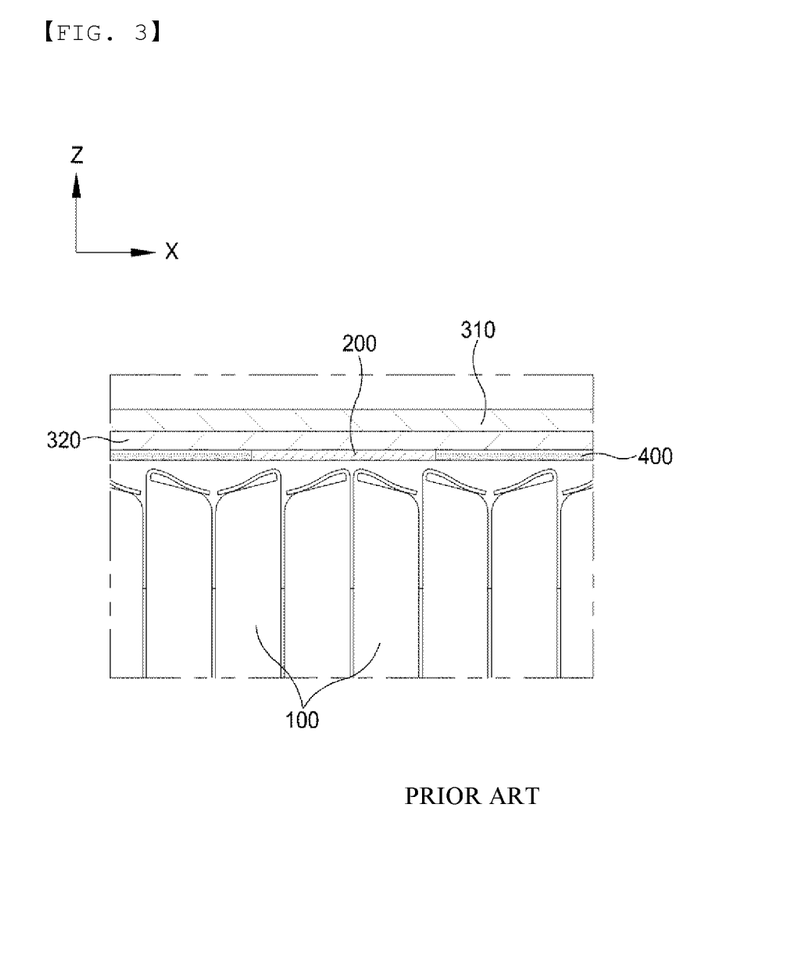
FIG. 3 is a sectional view schematically showing a plurality of battery cells and a circuit board of the conventional battery module.

As shown in FIGS. 1 to 3, a conventional battery module includes pouch-shaped battery cells 100. Each of the battery cells 100 includes an electrode assembly 110, electrode leads 120, and a pouch 130.

The electrode assembly 110 includes a plurality of electrode plates and a plurality of separators interposed between the plurality of electrode plates. The plurality of electrode plates include one or more positive electrode plates and one or more negative electrode plates. Each of the electrode plates of the electrode assembly 110 is provided with electrode tabs 140. The electrode tabs 140 are configured so as to protrude outwards from a corresponding one of the electrode plates.

The end (the connection part) of each of the electrode leads 120 is connected to the electrode assembly 110 via the electrode tabs 140, and the end of the electrode lead 120 that is opposite the connection part of the electrode lead, which is connected to the electrode assembly 110, is exposed outside of the pouch 130. The electrode leads 120 serve as electrode terminals of the battery module. The electrode leads 120 include a positive electrode lead 121 and a negative electrode lead 122. The electrode leads 121 and 122 are electrically connected to the electrode assembly 110 via the electrode tabs 140. The electrode leads 121 and 122 are welded to connection parts of the electrode tabs 140, whereby the electrode leads are connected to the electrode tabs 140.

Each of the plurality of electrode plates, i.e. the positive electrode plates and the negative electrode plates, is provided with the electrode tabs 140. The electrode tabs 140 include positive electrode tabs 141, which are connected to the positive electrode lead 121, and negative electrode tabs 142, which are connected to the negative electrode lead 122. A plurality of positive electrode tabs 141 is connected to a single positive electrode lead 121, and a plurality of negative electrode tabs 142 is connected to a single negative electrode lead 122.

The pouch 130 has therein a reception space, configured to receive the electrode assembly 110, and an electrolytic solution. The pouch 130 includes a first pouch member 131 and a second pouch member 132. A concave reception recess 133 is formed in one of the first pouch member 131 and the second pouch member 132.

The first pouch member 131 and the second pouch member 132 are coupled to each other in order to form the reception space. The edges of the first pouch member 131 and the second pouch member 132 are sealed together by thermal bonding, etc., whereby the reception space is hermetically sealed. The pouch 130 has an extension part 135, which extends from the part of the pouch in which the reception space is formed, and the electrode leads 120 are withdrawn outwards from the extension part 135.

As shown in FIG. 3, the plurality of battery cells 100 are sequentially stacked in the battery module. A circuit board 200 is disposed on one side of the stack in which the plurality of battery cells 100 are stacked, and a circuit board 200 is electrically connected to the plurality of battery cells 100.

The circuit board 200 is fixed to a frame 310 through a cover 320. A thermal interface material 400 (TIM) is applied to the surface of the cover 320 facing the plurality of battery cells 100. The frame 310 is connected to a heat sink, not shown, and the plurality of battery cells 100 are cooled, as heat generated from the plurality of battery cells 100 are transferred to the heat sink through the thermal interface material 400 and the frame 310.

The circuit board 200 has a predetermined length in the longitudinal direction (Y-axis direction) of the battery cell 100, and has a predetermined width in the direction (X-axis direction) in which the plurality of battery cells 100 are stacked. The circuit board 200 is disposed to face the plurality of battery cells 100 in a state in which a width direction of the circuit board 200 is parallel to a direction in which the plurality of battery cells 100 are stacked. Therefore, the circuit board 200 is disposed in a posture covering a part of the plurality of battery cells 100. Therefore, a problem may occur in that heat generated in the battery cell 100 covered by the circuit board 200 may be blocked by the circuit board 200 and thus may not be smoothly discharged to the outside. In addition, since the circuit board 200 covers only a part of the plurality of battery cells 100, there is a problem that the plurality of battery cells 100 may not be uniformly cooled as a whole.

In addition, as the cover 320 is interposed between the plurality of battery cells 100 and the frame 310 and the cover 320 prevents heat transfer, there is a problem that heat generated in the plurality of battery cells 100 may not be smoothly discharged to the outside.

DISCLOSURE

Technical Problem

The present invention has been made in view of the above problems, and it is an object of the present invention to provide a battery module in which heat generated from a plurality of battery cells can be smoothly discharged to the outside, and the plurality of battery cells can be uniformly cooled.

Technical Solution

In accordance with an embodiment of the present invention, the above and other objects can be accomplished by the provision of a battery module including a plurality of battery cells that are stacked on each other; a circuit module electrically connected to the plurality of battery cells; and a frame configured to have a circuit module fixing part to which the circuit module is fixed and coupled to the plurality of battery cells with circuit module therebetween to support the plurality of battery cells.

A thermal interface material may be applied to one surface of the frame facing the plurality of battery cells.

The circuit module fixing part may include a recess in which at least a part of the circuit module is inserted.

The circuit module may include a plate-shaped circuit part having a width and a length. The circuit part may be disposed between a pair of battery cells of the plurality of battery cells in a state in which a width direction of the circuit part is parallel to a direction perpendicular to a direction in which the plurality of battery cells are stacked.

At least a part of the circuit part may be inserted into an insertion space formed between the pair of battery cells.

The insertion space may be formed by interposing a spacer between the pair of battery cells.

The spacer may be configured to fix the plurality of battery cells to maintain a stacked state of the plurality of battery cells.

The circuit module may include a terminal part electrically connected to the plurality of battery cells, and a connection part connecting the circuit part and the terminal part. The circuit part, the connection part, and the terminal part may be integrally formed.

The circuit module may include a plurality of circuit units each comprising the circuit part, wherein the plurality of circuit units may be disposed to face each other in a direction perpendicular to a direction in which the plurality of battery cells are stacked.

A plurality of insertion spaces, in which at least a portion of the circuit part is inserted, may be formed between the plurality of battery cells. The circuit part of the plurality of circuit units may be disposed separately in the plurality of insertion spaces or may be inserted together in one insertion space.

BEST MODE

Hereinafter, a battery module according to an embodiment of the present invention will be described with reference to the accompanying drawings.

Figure 4:
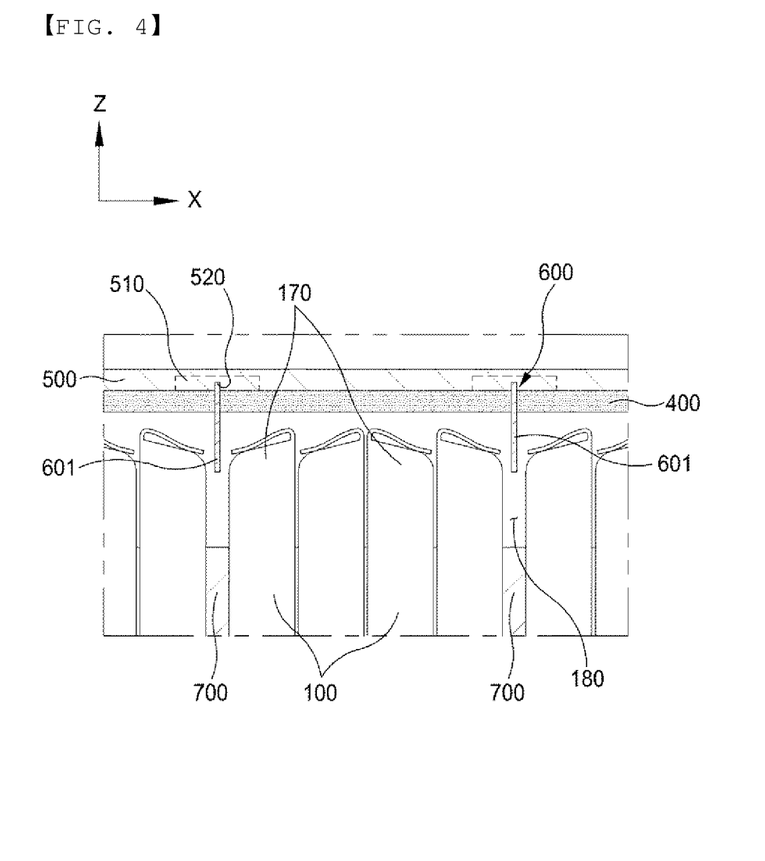
FIG. 4 is a sectional view schematically showing a battery module according to a first embodiment of the present invention.
Figure 5:
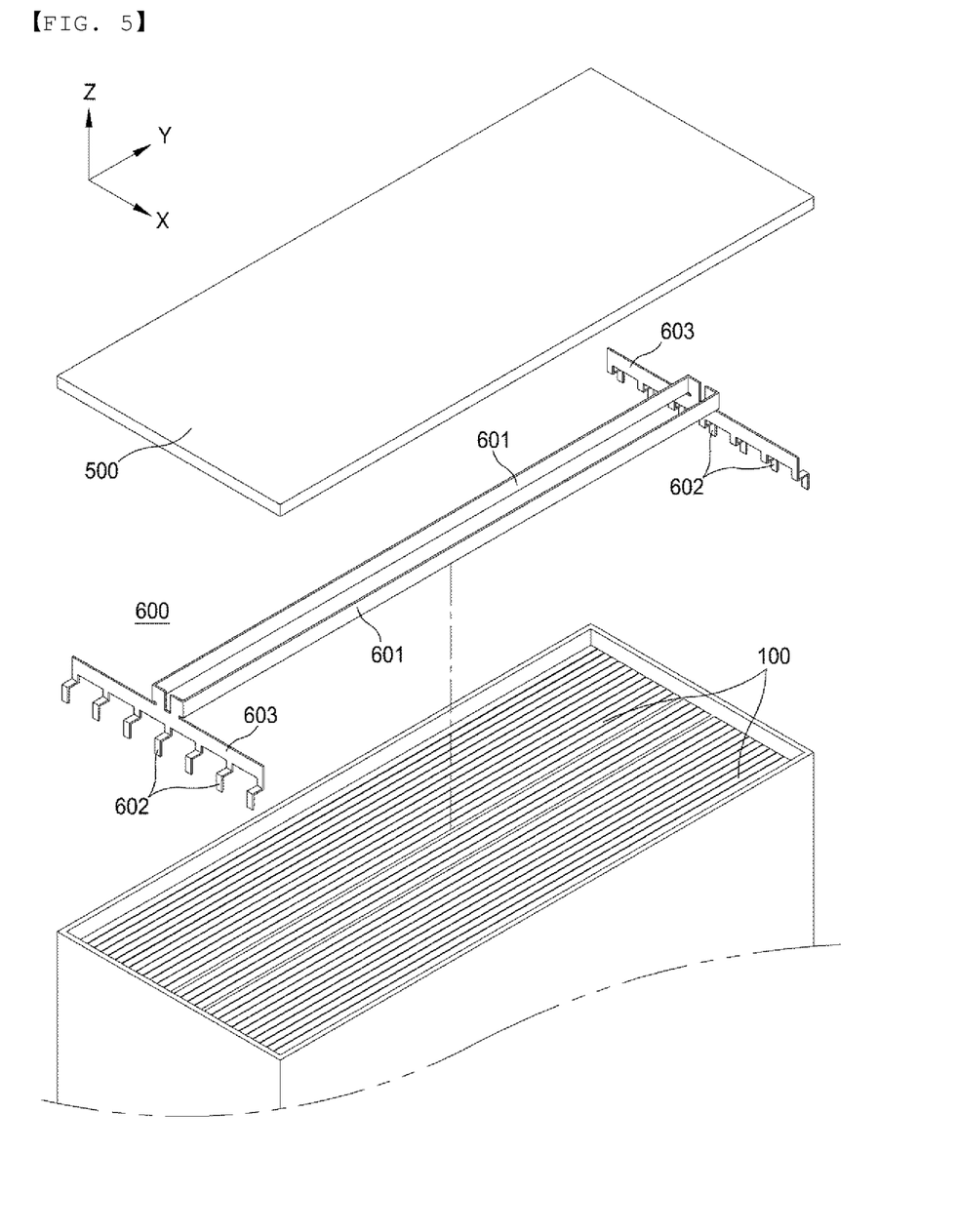
FIG. 5 is a perspective view schematically showing a circuit module and a plurality of battery cells included in the battery module according to the first embodiment of the present invention.

As shown in FIGS. 4 and 5, a battery module according to a first embodiment of the present invention includes a plurality of battery cells 100, a frame 500 supporting the plurality of battery cells 100, and a circuit module 600 electrically connected to the plurality of battery cells 100.

Each of the battery cells 100 is formed in a plate shape having a predetermined width, a predetermined length, and a predetermined thickness. Hereinafter, the length direction of the battery cell 100 will be defined as a Y-axis direction, the width direction of the battery cell 100 will be defined as a Z-axis direction, and the thickness direction of the battery cell 100 will be defined as an X-axis direction. Here, the plurality of battery cells 100 are stacked in the X-axis direction.

The frame 500 may be connected to a heat sink, not shown. The heatsink can be air cooled or water cooled. As heat generated in the plurality of battery cells 100 is transferred to the heat sink through the frame 500, the plurality of battery cells 100 may be cooled.

A thermal interface material 400 may be applied to a surface of the frame 500 facing the plurality of battery cells 100. Therefore, heat generated in the plurality of battery cells 100 may be discharged to the outside through the thermal interface material 400 and the frame 500. In this case, the circuit module 600 may be attached to the frame 500 through the thermal interface material 400 having adhesive properties. At least one of a thermal grease, a thermally conductive adhesive, and a phase change material may be used as the thermal interface material 400.

The circuit module 600 includes a circuit part 601, a terminal part 602, and a connection part 603 connecting the circuit part 601 and the terminal part 602.

The circuit module 600 may include a pair of circuit parts 601. The pair of circuit parts 601 may extend in the Y-axis direction and may be disposed to face each other in the X-axis direction. However, the present invention is not limited thereto, and one circuit module 600 may include one circuit part 601. The circuit module 600 may include a plurality of terminal parts 602 connected to the plurality of battery cells 100, respectively. However, the present invention is not limited thereto, and one circuit module 600 may include one terminal part 602, and in this case, a plurality of circuit modules 600 may be provided. In addition, one circuit module 600 may have a plurality of circuit parts 601, and the plurality of circuit units 601 may be connected to one terminal part 602, respectively.

For example, the circuit part 601 may be configured as an FPCB, but the present invention is not limited thereto. The circuit part 601 may be provided with an electronic component (not shown) such as a capacitor and a resistor. The circuit part 601 is formed in a plate shape. The circuit part 601 has a predetermined length in the Y-axis direction, a predetermined thickness in the X-axis direction, and a predetermined width in the Z-axis direction. The circuit part 601 is disposed so that the width direction of the circuit part 601 is parallel to the direction (Z-axis direction) perpendicular to the direction in which the plurality of battery cells 100 are stacked (the X-axis direction, i.e. the thickness direction of the battery cell 100). The circuit part 601 is disposed between any one pair of battery cells 100 among the plurality of battery cells 100. Therefore, an end 170 in the width direction (Z-axis direction) of the battery cell 100 may be exposed without being covered by the circuit part 601. Accordingly, heat generated in the battery cell 100 may be smoothly discharged to the outside without being blocked by the circuit part 601. In addition, since heat may be smoothly discharged from the plurality of battery cells 100 to the outside, the plurality of battery cells 100 may be uniformly cooled.

The plurality of terminal parts 602 may be disposed at predetermined intervals in a direction in which the plurality of battery cells 100 are stacked (X-axis direction). The plurality of terminal parts 602 may be electrically connected to electrode leads 120 (see FIGS. 1 and 2) of the plurality of battery cells 100.

The connection part 603 serves to connect the circuit part 601 and the plurality of terminal parts 602. For example, the connection part 603 may be made of a wire and the like. However, the connection part 603 may be formed integrally with the circuit part 601 and the plurality of terminal parts 602. The circuit part 601, the terminal part 602, and the connection part 603 may be integrally formed by various processes such as cutting and bending one plate, die casting, and the like. When the circuit part 601, the terminal part 602, and the connecting part 603 are integrally formed, the circuit part 601, the terminal part 602, and the connection part 603 may be positioned with respect to the plurality of battery cells 100 only by mounting the circuit module 600 on a stack formed by stacking a plurality of battery cells 100. Therefore, a process of assembling the plurality of battery cells 100 and the circuit module 600 may be easily performed.

The plurality of battery cells 100 are supported by the frame 500, and thus, a state in which the plurality of battery cells 100 are stacked may be maintained by the frame 500. Meanwhile, in order to reduce the size of the battery module in the Z-axis direction, at least a part of the circuit part 601 of the circuit module 600 is preferably inserted into an insertion space 180 between any one pair of battery cells 100 of the plurality of battery cells 100.

All or part of the circuit part 601 of the circuit module 600 may be inserted into the insertion space 180 between the pair of battery cells 100. As such, since at least a part of the circuit part 601 of the circuit module 600 is inserted into the insertion space 180 between the pair of battery cells 100, the size of the battery module in the Z-axis direction may be reduced as much as the circuit part 601 is inserted into the insertion space 180.

The insertion space 180 into which the circuit part 601 is inserted may be formed by interposing a spacer 700 between the pair of battery cells 100. For example, the spacer 700 may be connected to the frame 500. For example, the spacer 700 may be configured to fix the plurality of battery cells 100 together with the frame 500 to maintain the stacked state of the plurality of battery cells 100. Therefore, in the process of fixing the plurality of battery cells 100 using the spacer 700, the insertion space 180 may be formed between any one pair of battery cells 100 of the plurality of battery cells 100.

On the other hand, the frame 500 may include a circuit module fixing part 510 to which the circuit module 600 is fixed. The circuit module fixing part 510 may be provided on an inner surface of the frame 500 that faces the plurality of battery cells 100. As another example, when the thermal interface material 400 has adhesive properties, the circuit module 600 may be fixed to the circuit module fixing part 510 by the thermal interface material 400.

The circuit module fixing part 510 of the frame 500 may be provided with a recess 520 into which at least a part of the circuit module 600, i.e. a part of the circuit part 601, is inserted. As a part of the circuit part 601 is fixed to be inserted into the recess 520, the circuit module 600 may be firmly fixed to the circuit module fixing part 510 of the frame 500.

Since the frame 500 includes the circuit module fixing part 510, the plurality of battery cells 100 are supported by the frame 500 while the circuit module 600 is fixed to the circuit module fixing part 510. As a result of that, the position of the circuit module 600 with respect to the plurality of battery cells 100 may be easily determined.

In addition, since the frame 500 includes the circuit module fixing part 510, the thermal interface material 400 may be easily applied to the surface of the frame 500 while the circuit module 600 is fixed to the circuit module fixing part 510.

According to the first embodiment of the present invention, the circuit part 601 of the circuit module 600 is disposed between the pair of battery cells 100 of the plurality of battery cells 100 in a state where the width direction of the circuit part 601 is parallel to the direction perpendicular to the direction in which the plurality of battery cells 100 are stacked. Accordingly, since the end 170 of the battery cell 100 is exposed without being covered by the circuit part 601, heat generated in the battery cell 100 may be smoothly discharged to the outside without being blocked by the circuit part 601. In addition, since the circuit part 601 of the circuit module 600 is inserted into the insertion space 180 formed between any one pair of battery cells 100, the size of the battery module may be reduced.

In addition, according to the first embodiment of the present invention, since a cover that prevents heat transfer is not provided, heat generated in the plurality of battery cells may be smoothly discharged to the outside.

Hereinafter, a battery module according to a second embodiment of the present invention will be described with reference to FIGS. 6 to 8. The same components as those in the above-described first embodiment are denoted by the same reference numerals, and detailed description thereof will be omitted.

Figure 6:
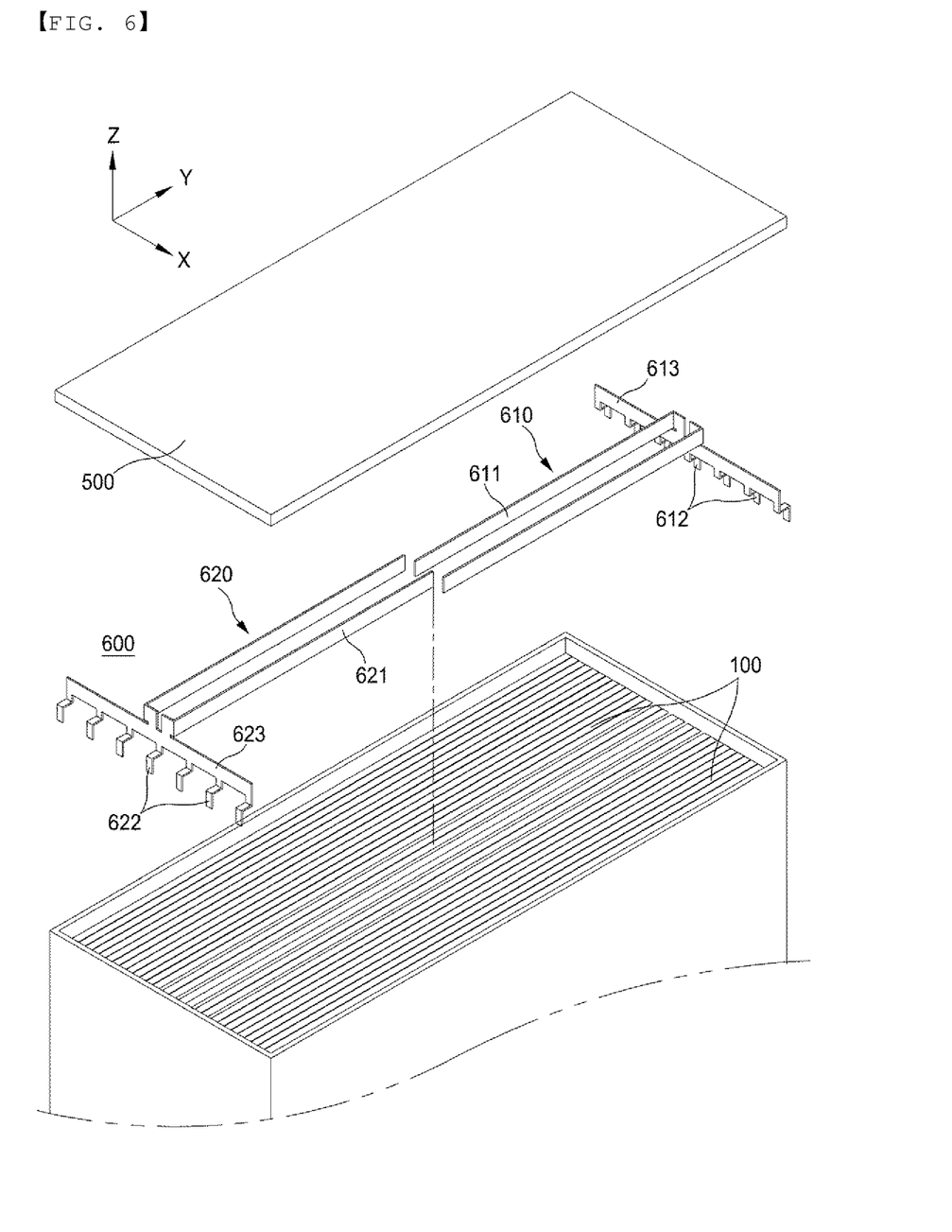
FIG. 6 is a perspective view schematically showing a circuit module and a plurality of battery cells included in a battery module according to a second embodiment of the present invention.
Figure 7:
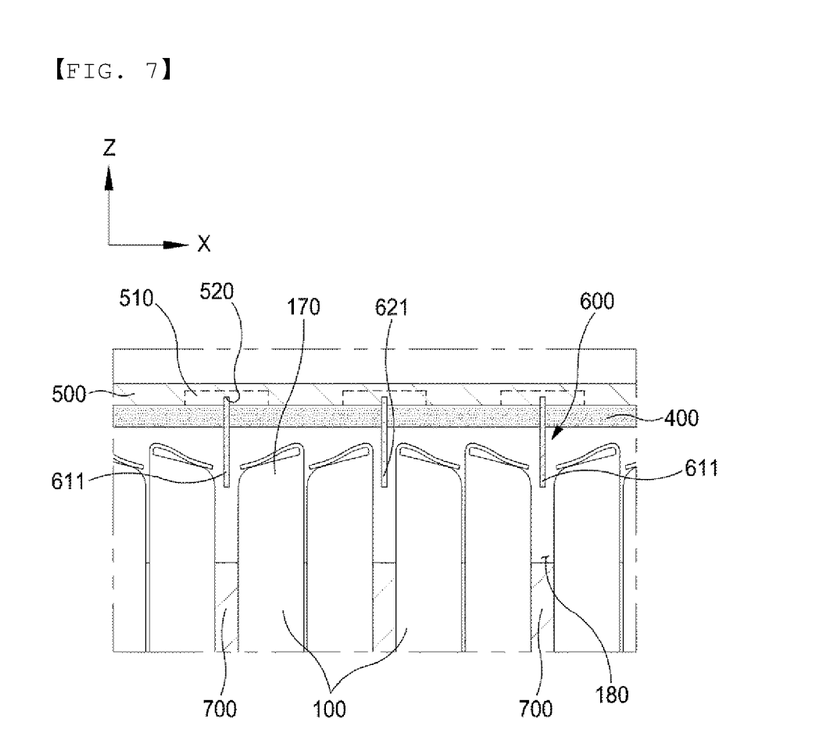
FIG. 7 is a sectional view schematically showing a battery module according to the second embodiment of the present invention.
Figure 8:
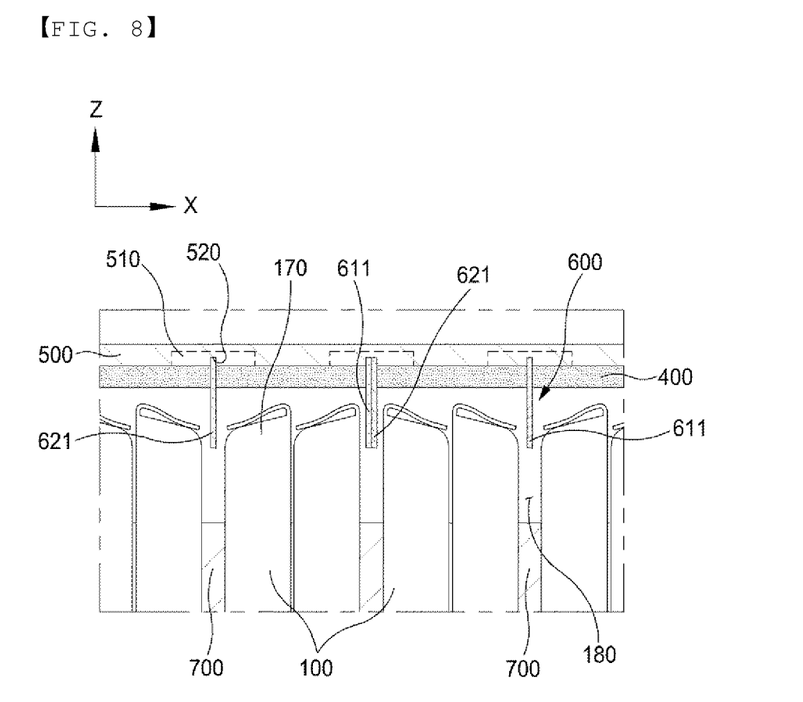
FIG. 8 is a sectional view schematically showing another example of the battery module according to the second embodiment of the present invention.

As shown in FIGS. 6 to 8, the battery module according to the second embodiment of the present invention includes a plurality of battery cells 100, a frame 500 supporting the plurality of battery cells 100, and a circuit module 600 electrically connected to the plurality of battery cells 100.

The circuit module 600 may include a plurality of circuit units 610 and 620. For example, the plurality of circuit units 610 and 620 may include a first circuit unit 610 and a second circuit unit 620.

The first circuit unit 610 includes a first circuit part 611, a first terminal part 612, and a first connection part 613. The second circuit unit 620 includes a second circuit part 621, a second terminal part 622, and a second connection part 623.

The configuration of the first and second circuit parts 611 and 621, the first and second terminal parts 612 and 622, and the first and second connection parts 613 and 623 may be similar to or the same as the configuration of the circuit part 601, the terminal part 602, and the connection part 603 of the battery module according to the first embodiment.

The first circuit part 611 and the second circuit part 621 may be disposed to face each other in the Y-axis direction. The first circuit part 611 and the second circuit part 621 may be connected to or separated from each other.

As shown in FIG. 7, the first circuit part 611 and the second circuit part 621 may be inserted separately into the plurality of insertion spaces 180 formed between the plurality of battery cells 100. As another example, as shown in FIG. 8, the first circuit part 611 and the second circuit part 621 may be inserted together in the plurality of insertion spaces 180 formed between the pair of battery cells 100.

According to the second embodiment of the present invention, the circuit module 600 includes the plurality of circuit units 610 and 620 disposed to face each other in the Y-axis direction. Therefore, according to the size of the battery module, i.e. the length and width of the battery cell 100, the number of battery cells 100, and the like, the plurality of circuit units 610 and 620 may be disposed at appropriate positions while adjusting the distance between the plurality of circuit units 610 and 620.

Although the preferred embodiments of the present invention have been described by way of illustration, the scope of the present invention is not limited to the specific embodiments described herein, and the present invention can be appropriately modified within the category described in the claims.

Description of Reference Numerals

100: Battery cell
400: Thermal interface material
500: Frame
600: Circuit module
700: Spacer Industrial Applicability According to an embodiment of the present invention, since a cover that prevents heat transfer is not provided, heat generated from a plurality of battery cells may be smoothly discharged to the outside.

In addition, according to the embodiment of the present invention, a circuit part of a circuit module is disposed between a pair of battery cells of the plurality of battery cells such that the width direction of the circuit part is parallel to the direction perpendicular to the direction in which the plurality of battery cells are stacked. Therefore, since an end of the battery cell is exposed without being covered by the circuit part, heat generated in the battery cell may be smoothly discharged to the outside without being blocked by the circuit part. In addition, since the circuit part of the circuit module is inserted into an insertion space formed between the pair of battery cells, the size of the battery module may be reduced.

The invention claimed is:

1. A battery module comprising:
a plurality of battery cells stacked on each other;
a circuit module electrically connected to the plurality of battery cells and comprising a plate-shaped circuit part having a width and a length; and
a frame having a circuit module fixing part to which the circuit module is fixed and coupled to the plurality of battery cells with the circuit module therebetween to support the plurality of battery cells,
wherein a thermal interface material is applied to an inner surface of the frame facing the plurality of battery cells, and
wherein the circuit module fixing part comprises a recess defined within the inner surface of the frame in which at least a portion of the plate-shaped circuit part is inserted, the plate-shaped circuit part is disposed between any one pair of battery cells of the plurality of battery cells in a state in which a width direction of the plate-shaped circuit part is parallel to a direction perpendicular to a direction in which the plurality of battery cells are stacked, so as an end of each one of the plurality of battery cells facing the inner surface of the frame is exposed without being covered by the plate-shaped circuit part, and at least the part of the plate-shaped circuit part is inserted into an insertion space formed between the pair of battery cells.

2. The battery module according to claim 1, wherein the insertion space is formed by interposing a spacer between the pair of battery cells.

3. The battery module according to claim 2, wherein the spacer is configured to fix the plurality of battery cells to maintain a stacked state of the plurality of battery cells.

4. The battery module according to claim 1, wherein
the circuit module comprises a terminal part electrically connected to the plurality of battery cells, and a connection part connecting the plate-shaped circuit part and the terminal part, and
the plate-shaped circuit part, the connection part, and the terminal part are integrally formed.

5. The battery module according to claim 1, wherein the circuit module comprises a plurality of circuit units each comprising the plate-shaped circuit part, the plurality of circuit units being disposed to face each other in a direction perpendicular to a direction in which the plurality of battery cells are stacked.

6. The battery module according to claim 5, wherein
a plurality of insertion spaces, in which at least a portion of the plate-shaped circuit part is inserted, are formed between the plurality of battery cells, and
each of the plate-shaped circuit parts of the plurality of circuit units are inserted separately in a respective one of the plurality of insertion spaces, or each of the plate-shaped circuit parts of the plurality of circuit units are inserted together in one insertion space.

7. A battery pack comprising the battery module according to claim 1.

* * * * *